May 13, 1930.  F. GIRARDI  1,758,315
GEAR CHANGE MECHANISM FOR AUTOMOTIVE VEHICLES
Filed Aug. 17, 1928  3 Sheets-Sheet 1
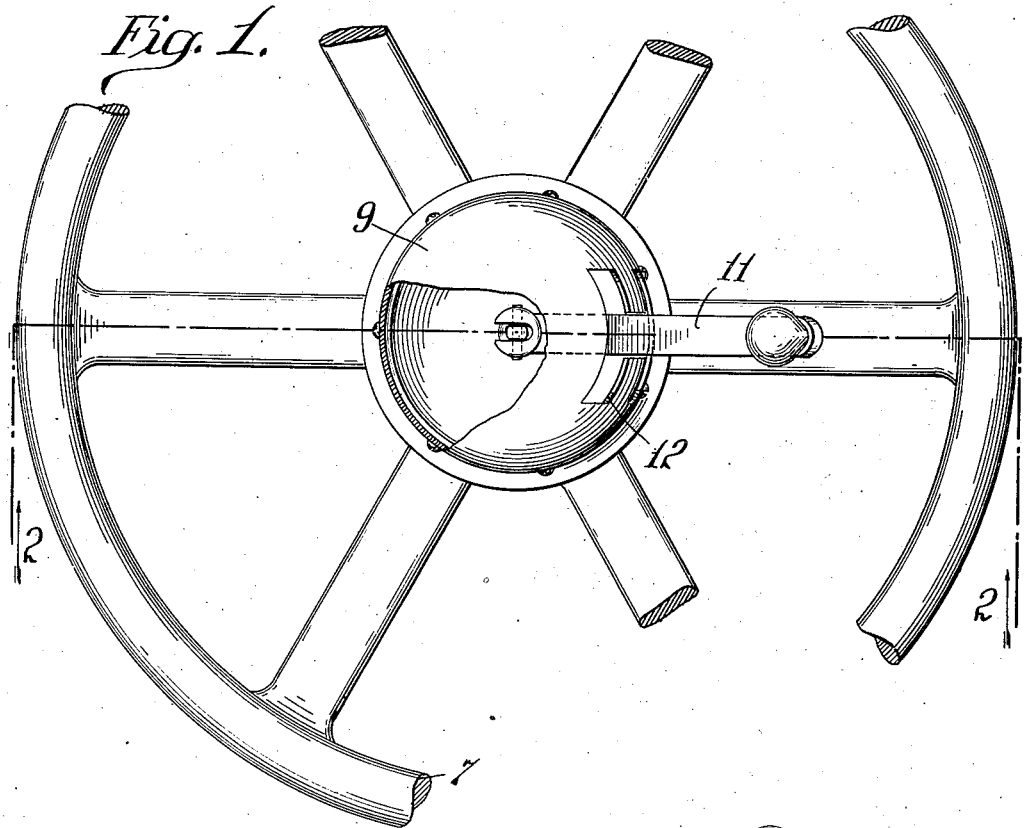
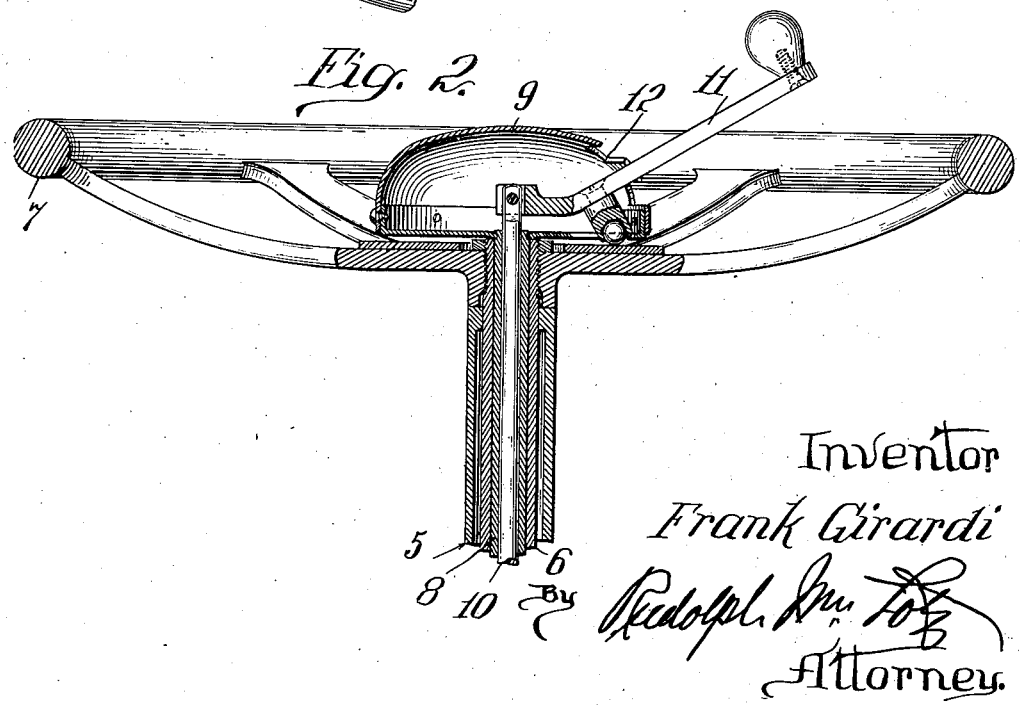
Inventor
Frank Girardi
Attorney.

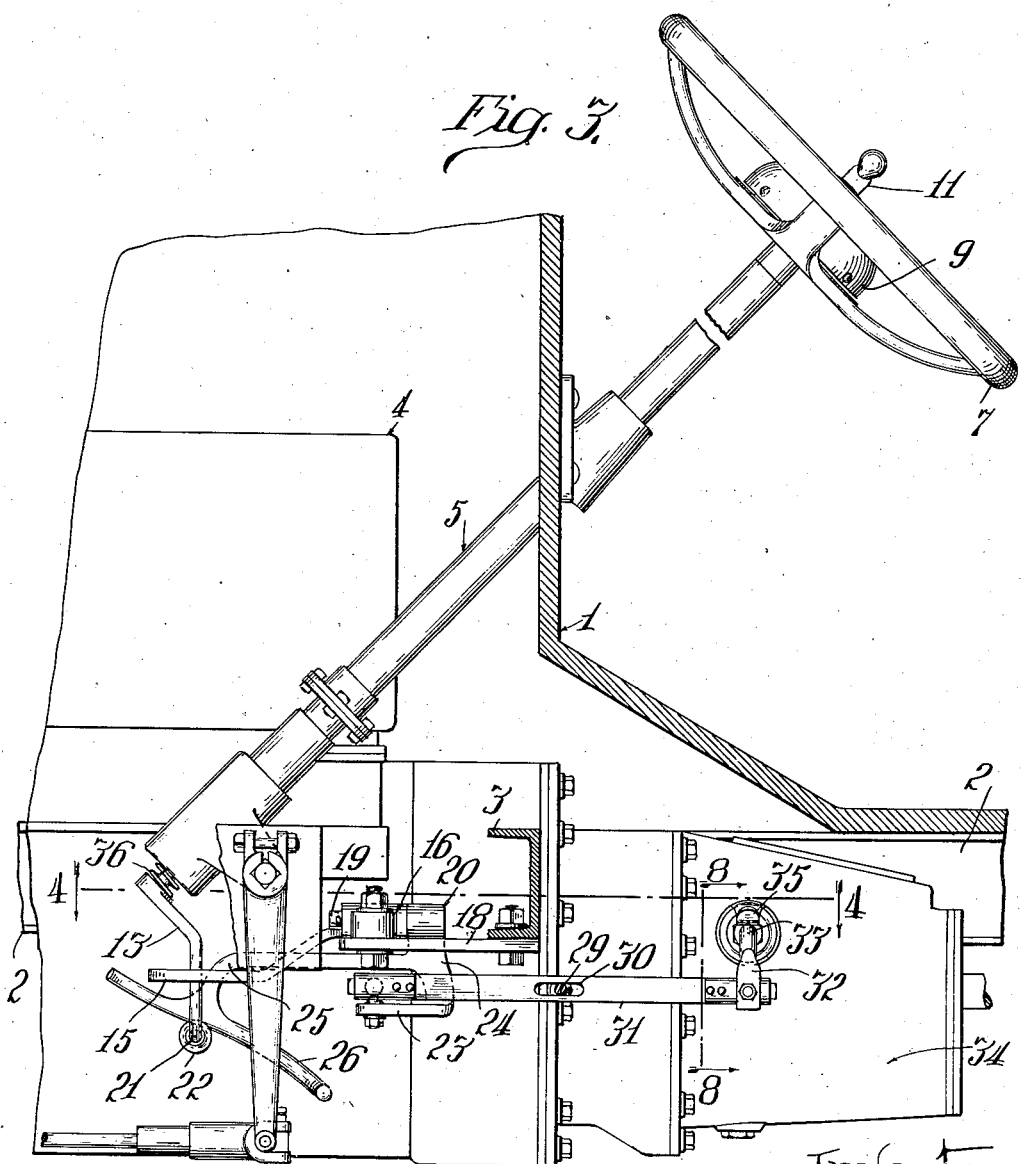

May 13, 1930.  F. GIRARDI  1,758,315
GEAR CHANGE MECHANISM FOR AUTOMOTIVE VEHICLES
Filed Aug. 17, 1928   3 Sheets-Sheet 3
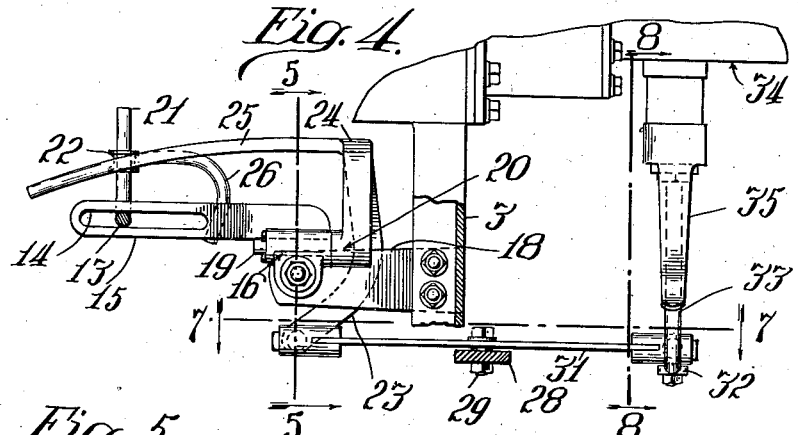
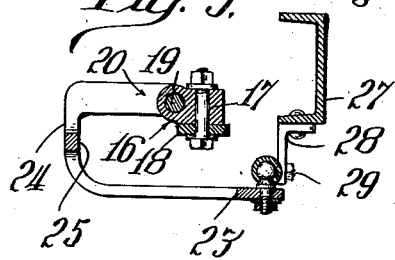
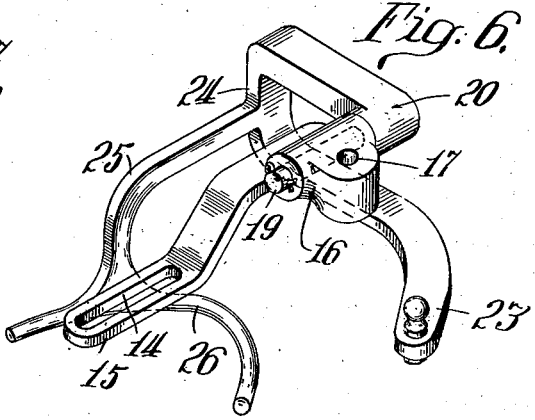
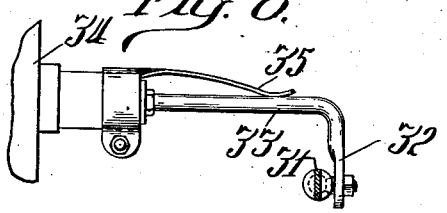
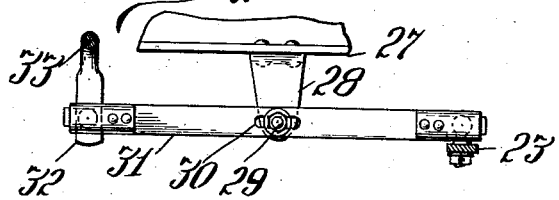
Inventor
Frank Girardi
By Rudolph [signature]
Attorney.

Patented May 13, 1930

1,758,315

UNITED STATES PATENT OFFICE

FRANK GIRARDI, OF CHICAGO ILLINOIS, ASSIGNOR TO EDWARD B. DUBLIN, OF CHICAGO, ILLINOIS, AND HIMSELF

GEAR CHANGE MECHANISM FOR AUTOMOTIVE VEHICLES

Application filed August 17, 1928. Serial No. 300,162.

This invention has for its object to provide a simple and efficient change-gear set operating mechanism associated with the steering wheel of an automotive vehicle for convenient manual operation, and having the secondary purpose of eliminating the gear shift lever now almost universally used which extends through the floor of the vehicle body and occupies valuable space besides presenting other known disadvantages.

A further important object of the present invention is to provide a very compact, easily operable gear-shift device including an operating lever movable to five different positions corresponding to those of the conventional shift-lever now generally used and which is more conveniently located and is capable of being operated without releasing a hand from the steering wheel.

Other objects of the invention will be pointed out and understood in and from the following specification.

In the accompanying drawings illustrating a suitable embodiment of the invention:

Fig. 1 is a plan view of a steering gear of an automotive vehicle equipped with a change-gear operating mechanism constructed in accordance with the invention.

Fig. 2 is a fragmentary central longitudinal section of the same on the line 2—2 of Fig. 1.

Fig. 3 is a fragmentary vertical longitudinal section of the portion of a conventional automotive vehicle which includes the dash-board, steering gear and the change gear set casing and adjacent parts.

Fig. 4 is a fragmentary detail plan section on the line 4—4 of Fig. 3.

Fig. 5 is a detail vertical section on the line 5—5 of Fig. 4.

Fig. 6 is a perspective view showing certain levers associated with each other and disassociated from the main operating lever on the steering wheel.

Fig. 7 is a vertical section on the line 7—7 of Fig. 4.

Fig. 8 is a detail vertical section on the line 8—8 of Fig. 4.

In said drawings the dashboard of the automotive vehicle is indicated at 1, a side bar of the frame at 2, a cross bar at 3 and the motor at 4. The steering post comprises the outer tubular member 5 which is of conventional construction and is rigid, and within which there is mounted the rotatable tube 6 which is operated by the steering wheel 7 and is associated in the usual manner with the steering gear.

Disposed within the tube 5 is a tube 8 which is also rigid and carries the shell or casing 9 disposed above the steering wheel 7. Extending through the tube 8 is a rock-shaft 10 which is also reciprocable in said tube 8 and is pivotally associated at its upper end with the hand lever 11. The latter is slightly V-shaped and projects at one end through an H-slot 12 in the shell or casing 9, the said slot 12 being so disposed that the long arms or slots thereof extend partially around the substantially cylindrical wall of said shell or casing. The lever 11 is pivotally associated with the bottom wall of said shell or casing 9 in such manner as to permit said lever to be rotated on the axis of the shaft 10 and also permit the projecting end portion thereof to be raised and lowered and thus reciprocate the shaft 10.

Upon the lower end of said shaft 10 there is mounted a crank arm 13 which passes through a longitudinal slot 14 in a lever 15 which is rigid with a member 16 comprising what may be termed two sleeves extending at right angles to each other, one of said sleeves having a vertical bore 17 through which a stud shaft on a bracket-arm 18 of the frame member 3 passes to pivotally associate the member 16 with the vehicle frame. A stud-shaft 19 integral with a member 20 passes through the bore of the other sleeve of the member 16. As the shaft 10 is rocked it will obviously impart pivotal movement to the member 16 on its vertical axis.

At the free end of the crank arm 13 is an arm 21 which extends at substantially a right angle thereto. Between the ends of this arm 21 is a deeply grooved sheave 22 which is rotatable and slidable on said arm.

The member 20 comprises the U-shaped portion equipped with the stud shaft 19 at the end of one of its arms, the other arm thereof terminating in a curved projection 23. From the middle portion 24 of the member 20 an arm 25 extends perpendicularly to the main arms of said member. The outer end portion of the arm 25 is curved through an arc of about ninety degrees downwardly and at its lower end is integral with an arcuate arm or yoke 26 disposed below and to each side of the lever 15. The sheave 22 engages the underside of the member 26 so that as the crank arm 13 is rocked, it will impart to the member 26 and the member 20 a corresponding rocking movement on the axis of the stud shaft 19.

A side frame member 27 carries a depending bracket 28 on which is mounted a stud or projection 29 which engages in the longitudinal slot 30 of a connecting rod 31. The latter is connected at one end by means of a universal joint connection with the free end of the curved projection 23 of the lower arm of the member 20. At its other end the rod 31 is associated by means of a universal joint connection with the depending arm 32 of the gear change lever 33 extending laterally from the change gear housing 34 which is turned through an arc of ninety degrees from its usual position in the vehicle. This gear change lever is mounted for universal pivotal movement relatively to the casing 34. A flat spring 35 bears on said lever 33 to hold it normally in neutral position, and a coiled spring 36 is provided between the crank arm 13 and steering post for normally maintaining the outer end portion of the lever 11 engaged with the top wall of the upper portion of the H-slot.

It is well known that in the conventional automotive vehicle, the lever 33 extends up through an H-slot in the floor of the body and is manually operated by direct engagement with a hand of the operator. In the present instance the operation of the lever 33 is unchanged, the invention residing in the above described mechanism whereby the movements of the lever 11 to the various parts of the H-slot 12 of the shell or housing 9 communicates a corresponding movement to the lever 33 to effect gear changes in the casing 34.

It will be obvious that an upward or downward movement of the outer end of the lever 11 will cause a corresponding movement of the member 20 on the axis of the shaft 19 and a rocking movement, in a substantially vertical plane, of the connecting rod 31 and this in turn causes the gear change lever 33 to rock in a vertical plane.

An upward movement of the hand lever 11 causes the same to lie in a position to be swung laterally to either right or left into an upper arm of the H-slot 12 and, as said lever is swung either to right or left, the shaft 10 will be rocked similarly. This will cause the crank arm 13 to swing the lever 15 correspondingly to thereby rock the member 20 on its vertical pivot and this movement of the member 20 causes a longitudinal movement of the connecting rod 31 and a substantially horizontal movement of the lever 33.

When the lever 11 is in position to be swung to right or left into the arms of the lower portion of the H-slot 12, the downward movement of the lever 11 causes an upward movement of the shaft 10 and a corresponding swing of the member 20 on shaft 19. As said lever 11 is moved to right or left the same reciprocatory movement of the rod 31 takes place as in the aforesaid instance with reference to the upper portion of the H-slot 12.

From the foregoing, it will be obvious that the rocking movements of the shaft 10 effect reciprocatory movements of the rod 31 and that reciprocatory movements of the shaft 10 effect rocking movements of said rod 31. The sheave 22 travels along the yoke 26 and slides on the arm 21 to thus accommodate itself to the rocking movements of the shaft 10 as well as the reciprocatory movements of the latter, the contour of the yoke 26 being such as to reduce the sliding movements of the sheave to a minimum or to completely obviate such sliding movement thereof.

I claim as my invention:

1. A change gear operating mechanism for automotive vehicles including a shaft extending through and rotatable and reciprocable relatively to the steering post, a lever associated with said shaft and the steering gear for rocking and reciprocating said shaft, a crank-arm at the lower end of said shaft, a rocking member mounted for pivotal movement on a vertical and a horizontal axis, a rod associating said member with the change gear lever of the change gear set of the vehicle, means effecting operative association of said member with said crank-arm for rocking said member on its horizontal axis, and a lever associated with said crank-arm and said member for rocking the latter on its vertical axis.

2. A change gear operating mechanism comprising a rock shaft extended through and reciprocable relatively to the steering post of the steering gear, a hand lever fulcrumed between its ends and associated at one end with said shaft for rocking and reciprocating the same, a crank-arm at the other end of said shaft, a reciprocable rod fulcrumed between its ends on the vehicle frame and connected at one end with the shift lever of the change gear set, a rocking member mounted for rocking on both a vertical and a horizontal axis and operatively connected with the other end of said rod, a lever associated with said member and said crank-arm for rocking the former on its vertical axis as said shaft is rocked to thereby reciprocate said rod, a lateral arm on said crank-arm extending perpendicularly to said shaft, and a cam element on said member operatively engaged with said arm for rocking said member on its horizontal axis as said shaft is reciprocated to thereby rock said rod.

3. Mechanism of the type defined including the steering post, steering shaft, a rock-shaft extending axially of the steering shaft, a cylindrical shell having a flat bottom wall rigid with said steering post and provided in its circumferential wall with a substantially horizontally disposed H-slot, a hand lever associated at one end with the upper end of said rock-shaft and pivotally supported between its ends on said flat bottom wall, the free end portion of said lever projecting through said H-slot and adapted to be moved into any part of said slot to thereby rock and reciprocate said rock-shaft, a rod having a longitudinal slot between its ends operatively associated at one end with the shift lever of the change gear set, a projection on the vehicle frame engaging in said slot of said rod, a crank-arm on said rock-shaft, an arm at the end of said crank-arm extending perpendicularly of said rod, and means associated with said crank and said arm and operatively associated with the other end of said rod for rocking the latter as said rock-shaft is reciprocated and reciprocating said rod as said rock-shaft is rocked.

4. An automotive vehicle equipped with a conventional change gear set having a shift lever projectiong laterally from one side of the casing, a rod having a longitudinal slot between its ends connected at one end with said shift lever, a stud on the vehicle frame engaging in said slot for permitting said rod to be rocked and reciprocated to vary the position of said lever, a rock-shaft passing axially through the steering gear and reciprocable therein, a hand lever associated with the upper end of said rock-shaft for rocking and reciprocating the same, a crank-arm at the other end of said rock-shaft, a second arm rigid with relation to and extending perpendicularly of said rock-shaft, a lever pivotally mounted on the same to swing on a vertical axis and operatively associated with said crank-arm and said rod to reciprocate the latter as said rock-shaft is rotated, and a lever associated with the second arm of said rock-shaft and with said rod and pivotally associated with the vehicle frame to swing on a horizontal axis for rocking said rod as said rock-shaft is reciprocated.

5. A change gear operating mechanism comprising a hollow steering shaft, a tube disposed axially of said shaft and rigidly associated with the steering post, a steering wheel on said shaft, said tube projecting axially through said wheel, a circular plate mounted on the upper end of said tube, a cylindrical shell having a substantially horizontal H-slot therein bordering said plate, a reciprocable rock-shaft mounted axially of said tube, a hand lever connected with the upper end of said rock-shaft fulcrumed between its ends on said plate and projecting at its free end portion through said H-slot and adapted to impart rocking and reciprocating movements respectively to said shaft as said hand lever is moved from one part of said H-slot to another, a conventional change gear set on said vehicle having the shift lever thereof extending substantially horizontally from the housing of said set, a rod connected at one end with the said shift lever, a horizontal stud on the vehicle frame engaging in a longitudinal slot between the ends of said rod to permit the latter to be rocked and reciprocated respectively, a crank-arm on the lower end of the rock-shaft, an arm rigid relatively to and disposed perpendicularly of said rock-shaft, a member pivotally mounted on the vehicle frame for rocking on a vertical axis and equipped with a horizontal stud shaft, a longitudinally slotted lever integral with said member and engaged by means of said slot with said crank-arm for rocking said member as said rock-shaft is rotated, a cam member mounted on said horizontal stud shaft of said member and having an arm connected with the other end of said rod and having a cam portion operatively engaged with said second arm of said rock-shaft, said second arm and said crank-arm adapted to impart rocking movements to said cam member on horizontal and vertical axes respectively as said rock-shaft is reciprocated and rotated respectively.

6. An automotive vehicle equipped with a conventional change gear set having a shift lever projecting laterally from one side of the casing, a rod having a longitudinal slot between its ends connected at one end with said shift lever, a stud on the vehicle frame engaging in said slot for permitting said rod to be rocked and reciprocated to vary the position of said lever, a rock-shaft passing axially through the steering gear and reciprocable therein, a hand lever associated with the upper end of said rock-shaft for rocking and reciprocating the same, a crank-arm at the other end of said rock-shaft, a second arm rigid with relation to and extending perpendicularly of said rock-shaft, a lever pivotally mounted on the same to swing on a vertical axis and operatively associated with said crank-arm and said rod to reciprocate the latter as said rock-shaft is rotated, and a lever associated with the second arm of said rock-shaft and with said rod and pivotally associated with the vehicle frame to swing on a horizontal axis for rocking said rod as said rock-shaft is reciprocated, and means associated with the steering post and said hand lever for holding the latter firmly in any one of several positions to which it is moved, and a spring for normally maintaining said rock-shaft at the lower limit of its movement.

FRANK GIRARDI.